United States Patent Office 2,917,509
Patented Dec. 15, 1959

2,917,509

SODIUM SALT OF 6-(p-AMINOBENZENE-SULFON-AMIDO)-3-CHLORO-PYRIDAZINE

Jean Druey, Riehen, Switzerland, assignor to Ciba Pharmaceutical Products, Inc., Summit, N.J.

No Drawing. Application October 12, 1953
Serial No. 385,685

Claims priority, application Switzerland October 23, 1952

1 Claim. (Cl. 260—239.7)

The present invention relates to the manufacture of 6-(para-aminobenzene-sulfonamido)-3-halogen-pyridazines of the formula

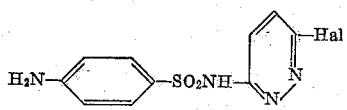

in which Hal indicates a chlorine or bromine atom, and their salts, as for example those of the alkali and alkaline earth metals, especially of sodium. The new compounds possess valuable chemotherapeutic properties as compared with known comparable aminobenzene sulfonamides. Thus they can be used with advantage as medicaments both in cases of cocci infections and also against malaria. Especially remarkable is the discovery that the aqueous solution of their sodium salts exhibits a very low pH-value, namely only 7.9. This is the more surprising since the sodium salt solutions of other, known (6-para-aminobenzene-sulfonamido)-pyridazines possess considerably higher pH-values, thus for example the corresponding 3-methyl derivative has a value of 9.3.

The new aminobenzene-sulfonamido-pyridazines may be produced according to conventional methods for the manufacture of para-aminobenzene-sulfonamides. Thus, for example, a benzene sulfonic acid chloride, which contains in para-position a substituent convertible by hydrolysis or reduction into the amino group, such as an acylamino, nitro or azo group, may be reacted with 6-amino-3-chloro- or 6-amino-3-bromo-pyridazine. It is further possible to react together a corresponding para-substituted benzene sulfonic acid amide and a 6-halogen-3-chloro- or 6-halogen-3-bromo-pyridazine. The reaction concerned is advantageously carried out in the presence of diluents and condensing agents.

From the new aminobenzene sulfonamides, salts can be produced in the customary manner, as, for example, by reaction with bases such as alkali or alkaline earth hydroxides or organic bases.

The following examples illustrate the invention, the relation between parts by weight and parts by volume being the same as that between the gram and the cubic centimeter.

*Example 1*

15.3 parts by weight of 3-chloro-6-amino-pyridazine are suspended in 50 parts by volume of pyridine and treated with 43 parts by weight of para-carbethoxyaminobenzene sulfochloride. Heating is carried out gradually to 80° C. with stirring and the whole is allowed to stand for 2 hours at this temperature. On pouring the reaction mixture into ice-cold excess 2-normal hydrochloric acid, the 6-(para-carbethoxyaminobenzene-sulfonamido)3-chloropyridazine separates in solid form. It melts at 198–200° C. 10 parts by weight thereof are heated to boiling for one hour in 100 parts by volume of normal caustic soda solution. After cooling to 60° C. the reaction solution is treated with acetic acid, whereby the 6-(para-aminobenzene-sulfonamido)-3-chloro-pyridazine precipitates in crystalline form. For complete purification it may be recrystallized from aqueous alcohol and then melts at 189–190° C. The new substance constitutes a yellowish colored crystallizate which dissolves easily in aqueous sodium bicarbonate solution. It can be converted into its salts in the following manner:

31.4 parts by weight of 6-(para-aminobenzene-sulfonamido)-3-chloro-pyridazine are agitated for 1 hour in a solution of 100 parts by volume of N-sodium-hydroxide. The undissolved portions are then separated off and the filtrate is evaporated to dryness in vacuo. The solid residue is pulverized and dried at 80° C. The resulting sodium salt of 6-(para-aminobenzene-sulfonamido)-3-chloro-pyridazine turns black at a temperature of over 280° C. approximately.

31.4 parts by weight of 6-(para-aminobenzene-sulfonamido)-3-chloro-pyridazine are agitated for an hour with a solution of 2.4 parts by weight of a lithium hydroxide in 100 parts by volume of water. The filtered solution is evaporated thoroughly in vacuo and the pulverized residue dried at 105° C. The resulting lithium salt of 6-(para-aminobenzene-sulfonamido)-3-chloro-pyridazine is very hydroscopic and easily soluble in water.

1 part by weight of 6-(para-aminobenzene-sulfonamido)-3-chloro-pyridazine is agitated with a clear solution of 0.111 part by weight of calcium hydroxide in 60 parts by volume of water for an hour. The filtered solution is evaporated to dryness in vacuo and the residue dried. The resulting calcium salt of 6-(para-aminobenzene-sulfonamido)-3-chloro-pyridazine turns black at a temperature of over 300° C. approximately, and is soluble in water to about 5%.

The 3-chloro-6-amino-pyridazine used as starting material may be prepared as follows:

5 parts by weight of 3:6-dihydroxy-pyridazine are heated for one hour on the water bath in the presence of 25 parts by volume of phosphorus oxychloride. The excess of phosphorus oxychloride is thereupon removed in vacuum. Ice water is added to the residue, whereby 3:6-dichloro-pyridazine separates. When recrystallized from hexane, it melts at 70° C.

5 parts by weight of 3:6-dichloro-pyridazine are heated for 6 hours in a pressure vessel to 100° C. with 50 parts by volume of concentrated aqueous ammonia. After cooling, there are obtained by filtration with suction about 4 parts by weight of 3-chloro-6-amino-pyridazine of melting point 210° C.

*Example 2*

A mixture of 15 parts by weight of 3:6-dichloro-pyridazine, 17 parts by weight of para-aminobenzene-sulfonamide and 14 parts by weight of anhydrous potassium carbonate, is heated for 4 hours to 150° C. whereby carbon dioxide is evolved with foaming. After cooling, the solidified reaction mixture is treated with 130 parts by volume of water and separated from a little undissolved para-aminobenzene-sulfonamide which has not entered into reaction. The filtrate is acidified with acetic acid, whereby the 6-(para-aminobenzene-sulfonamido)-3-chloro-pyridazine is precipitated. It is purified by boiling with water and recrystallizing from aqueous alcohol, whereby a product is obtained which is identical with that produced according to Example 1.

*Example 3*

3.5 parts by weight of 3-bromo-6-amino-pyridazine are suspended in 15 parts by volume of pyridine and treated with 5.5 parts by weight of para-carbethoxyaminobenzene-sulfochloride. The reaction mixture is heated for 1 hour to about 80° C. and then poured into 30 parts by volume of 2-normal hydrochloric acid with cooling with pieces of ice. The separated product (melting point 190–192° C. with decomposition; the pure 6 - para-carbethoxyaminobenzene - sulfonamido - 3 - bromo-pyridazine, recrystallized from 90 percent alcohol, melts at 195–197° C.) is taken up in 10 times its quantity of normal caustic soda solution and clarified by filtration from a small quantity of impurity. The alkaline solution is heated for 1 hour to boiling. The 6 - (para - aminobenzene - sulfonamido) - 3 - bromo - pyridazine produced is precipitated by addition of 50 percent acetic acid and recrystallized from 50 percent alcohol. The new compound possesses no sharp melting point but decomposes above 200° C. It can be converted into its sodium salt in the manner described in Example 1.

The 3-bromo-6-amino-pyridazine used as starting material, can, for example, be obtained in the following manner:

9 parts by weight of 3:6-dihydroxy-pyridazine and 70 parts by weight of phosphorus pentabromide are triturated together and heated for 1½ hours on a boiling water bath. A liquid melt is first formed which then solidifies again. 150 parts by weight of ice water are added to the mixture and a solid precipitate is thus obtained. After cooling to 5° C. the precipitate is filtered with suction, washed with a small amount of ice-water and dried. The 3:6-dibromo-pyridazine thus obtained melts at 117–118° C.

16 parts by weight of this compound and 160 parts by weight of concentrated aqueous ammonia are heated in a bomb tube for 6 hours at 100–110° C. The 3-bromo-6-amino-pyridazine which crystallizes out on cooling is filtered with suction, washed with a little water and dried. It has no characteristic melting point but turns black above 180° C.

What is claimed is:

The sodium salt of 6-(p-amino-benzene-sulfonamido)-3-chloro-pyridazine.

References Cited in the file of this patent

UNITED STATES PATENTS

| | | |
|---|---|---|
| 2,371,115 | Winnek et al. | Mar. 6, 1945 |
| 2,475,673 | Northey et al. | July 12, 1949 |
| 2,533,033 | Moore | Dec. 5, 1950 |
| 2,671,086 | Rogers et al. | Mar. 2, 1954 |

FOREIGN PATENTS

| | | |
|---|---|---|
| 563,629 | Great Britain | Aug. 23, 1944 |